[12] United States Patent
Smith et al.

(10) Patent No.: US 7,292,569 B1
(45) Date of Patent: Nov. 6, 2007

(54) DISTRIBUTED ROUTER FORWARDING ARCHITECTURE EMPLOYING GLOBAL TRANSLATION INDICES

(75) Inventors: Michael Smith, Morgan Hill, CA (US); Faisal Mushtaq, Santa Clara, CA (US); Gyaneshwar Saharia, Cupertino, CA (US); Shreeram Bhide, San Jose, CA (US); Hemant Hebbar, Sunnyvale, CA (US); Nelson D'Souza, Cupertino, CA (US); Karthikeyan Gurusamy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 994 days.

(21) Appl. No.: 10/375,786

(22) Filed: Feb. 26, 2003

(51) Int. Cl.
*H04L 12/50* (2006.01)

(52) U.S. Cl. .................... 370/383; 370/395.31

(58) Field of Classification Search .............. 370/389, 370/379, 371, 381, 382, 383, 392, 395.31, 370/395.7, 358, 359, 360, 428, 395.43, 395.42, 370/395.71
See application file for complete search history.

(56) References Cited

U.S. PATENT DOCUMENTS

| | | | | |
|---|---|---|---|---|
| 5,802,278 | A | 9/1998 | Isfeld et al. | 395/200.02 |
| 6,014,380 | A | 1/2000 | Hendel et al. | 370/392 |
| 6,178,455 | B1 * | 1/2001 | Schutte et al. | 709/228 |
| 6,938,138 | B2 * | 8/2005 | Beukema et al. | 711/163 |

* cited by examiner

*Primary Examiner*—Brenda Pham
(74) *Attorney, Agent, or Firm*—Cindy Kaplan

(57) ABSTRACT

An efficient distributed architecture for forwarding packets. The packet to be forwarded arrives in an ingress port, is processed by an ingress forwarding engine, transferred to an egress forwarding engine, and then transmitted via an egress port. An address-based lookup at the ingress forwarding engine identifies the correct egress forwarding engine and also identifies a translation index specifying the forwarding equivalence class (e.g., combination of address prefix and mask) of the packet. The egress forwarding engine then uses the translation index as a memory pointer to recover adjacency information with which to rewrite the packet header. The egress forwarding engine may maintain its adjacency information entirely locally without the need to share the information or propagate updates to ingress forwarding engines. This approach results in a scalable and highly efficient packet forwarding architecture.

20 Claims, 4 Drawing Sheets

DISTRIBUTED ROUTER FORWARDING ARCHITECTURE EMPLOYING GLOBAL TRANSLATION INDICES

BACKGROUND OF THE INVENTION

The present invention relates to data networking and more particularly to systems and methods for handling a packet to be forwarded by a network device.

With the continued growth of networks employing Internet Protocol (IP) such as the Internet and enterprise networks, there is a growing requirement for further advances in the performance of packet forwarding devices such as routers and switches. To cope with the growing volume of IP traffic, there is a demand for routers and switches that can receive and forward packets at a very high rate. To simplify network implementation and provide connectivity to large numbers of users and customers, it is desirable to provide routers and switches with very large numbers of ports.

To better meet these requirements, distributed architectures have been developed for network devices. A distributed architecture network device will typically have a very large number of linecards and each of the linecards will have one or more ports for coupling to physical media. Handling of a packet may involve receipt of that packet on an ingress linecard, transfer to an appropriate egress linecard, followed by transmission of the packet to a next-hop network device. The network device as a whole must determine the next-hop destination and appropriate output port for each packet. Various techniques have been developed for distributing the necessary decision-making and control among elements of the network device. The resulting distributed architecture implementations vary in scalability and packet handling speed.

In one approach, not admitted to be prior art, the ingress linecard makes essentially all the forwarding decisions. The ingress linecard performs a lookup in a local forwarding information base (FIB) based on the packet destination address to identify the appropriate egress linecard and next-hop. To facilitate the lookup, the FIB is preferably stored in a content-addressable memory. The ingress linecard also rewrites the packet header to include the appropriate source and destination link layer addresses for transmit to the next-hop and makes any other necessary header changes. Implementing this scheme thus requires that each ingress linecard maintain information about all of the adjacent network nodes for the entire network device. This raises significant scaling issues where there are large numbers of linecards since a very large amount of adjacency information (i.e., information used to select output ports and/or rewrite headers to direct packets to the next hop node) must be maintained on each ingress linecard and any change in the adjacency information must be propagated to all ingress linecards.

In a second architecture, also not admitted to be prior art, the ingress linecard uses the destination address of the packet to pick the correct egress linecard but does not actually rewrite the link layer packet header. Rewrite of the packet header occurs at the egress linecard based on another lookup of the packet's destination. This approach is advantageous from the viewpoint of scalability in that each egress linecard need maintain only the adjacency information for the network nodes to which it connects rather than all the network nodes adjacent to any port of the network device. However, there now need to be two address-based lookups, one on the ingress linecard and one on the egress linecard. Each lookup requires the use of content addressable memory (CAM) and other hardware, increasing hardware cost and complexity. Each address-based lookup also takes time, increasing the overall latency through the router.

In another approach, also not admitted prior art, the ingress linecard performs a destination address-based lookup to identify not only the egress forwarding engine but also a pointer that will be used at the egress linecard to retrieve the adjacency information necessary to rewrite the packet header. The egress linecard then need only use the pointer to retrieve the correct adjacency information for packet rewrite and does not need to do an address-based lookup. This saves on both complexity and processing time. However, there are still concerns about scalability. Even though the ingress linecard does not maintain full adjacency information for all the possible egress linecards, it still must update its stored pointer values to track adjacency changes for the entire network device. Information about adjacent network nodes thus must be maintained and updated centrally for the network device.

Improved distributed forwarding architectures are needed that will be readily scalable to very large numbers of interfaces. It is desirable that these improved distributed forwarding architectures be readily implemented with minimal hardware cost and complexity.

SUMMARY OF THE INVENTION

Embodiments of the present invention provide an efficient distributed architecture for forwarding packets. The packet to be forwarded arrives in an ingress port, is processed by an ingress forwarding engine, transferred to an egress forwarding engine, and then transmitted via an egress port. An address-based lookup at the ingress forwarding engine identifies the correct egress forwarding engine and also identifies a translation index specifying the forwarding equivalence class (e.g., combination of address prefix and mask) of the packet. The egress forwarding engine then uses the translation index as a memory pointer to recover adjacency information with which to rewrite the packet header. The egress forwarding engine may maintain its adjacency information entirely locally without the need to share the information or propagate updates to ingress forwarding engines. This approach results in a scalable and highly efficient packet forwarding architecture.

A first aspect of the present invention provides a method for operating a network device to forward a packet. The method includes: receiving the packet at an ingress forwarding engine, at the ingress forwarding engine, performing an address-based look-up in an ingress look-up table to identify an egress forwarding engine and a translation index, transferring the packet to the identified egress forwarding engine along with the identified translation index, at the identified egress forwarding engine, retrieving a pointer from a memory location specified using the translation index as an address, and using the pointer to retrieve adjacency information for the packet. An association between the translation index and a particular forwarding equivalence class is shared between the ingress forwarding engine and the egress forwarding engine.

A second aspect of the present invention provides apparatus for forwarding a packet. The apparatus includes a first forwarding engine that performs an address-based look-up for the packet in an ingress look-up table to identify an egress forwarding engine and a translation index and transfers the packet to the identified egress forwarding engine along with the identified translation index and a second forwarding engine that retrieves a pointer from a memory location specified by the translation index without use of content-based addressing and uses the pointer to retrieve adjacency information for the packet. An association between the translation index and a particular forwarding equivalence class is shared between the ingress forwarding engine and the egress forwarding engine.

Further understanding of the nature and advantages of the inventions herein may be realized by reference to the remaining portions of the specification and the attached drawings.

DESCRIPTION OF SPECIFIC EMBODIMENTS

Figure 1:
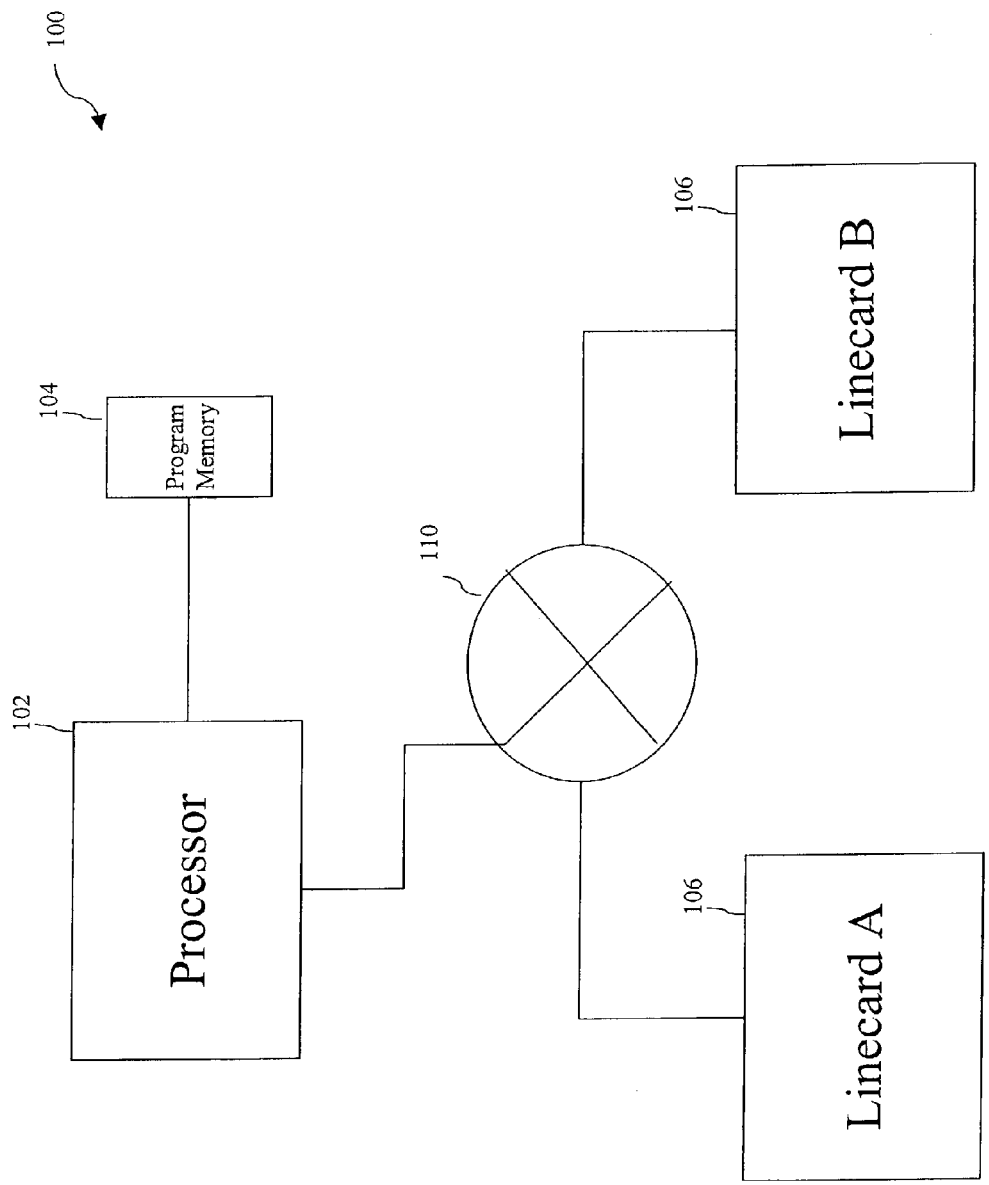
FIG. 1 depicts elements of a network device according to one embodiment of the present invention.

The present invention may find application in many types of network devices such as routers and switches that receive a packet via an input port and transmit that packet via an output port. Such a network device may form part of a larger network, e.g., a network that operates in accordance with Internet Protocol (IP). Although the present invention will be described with reference to the handling of IPv4 packets, it will be understood that "packets" herein refer to any type of packet, frame, cell, datagram, etc., irrespective of the network protocol that is being implemented.

The selection of output port for a packet to be forwarded will depend on selection of a desired next-hop node on the way to the packet's ultimate destination. Selection of the next-hop will typically depend on the packet's destination IP address. Transmission of the packet will also typically involve rewriting the link layer header of the packet to show the link layer address of the forwarding network device and the next-hop. There also may be necessary adjustments to the IP header such as decrementing the value in the time-to-live (TTL) field.

The selection of output port and next-hop node depends on what is referred to as the forwarding equivalence class (FEC) of the packet. Each forwarding equivalence class is specified by a variable length address prefix and a mask that specifies the length of the prefix in the address. There is a match between the destination address and a forwarding equivalence class if the destination address value and prefix value are bit-wise identical for the length of the prefix specified by the mask. The forwarding equivalence class of the packet is the one specified by the longest prefix that matches the packet's destination address. This is the preferred technique, referred to as longest match, for determining the forwarding equivalence class of the packet.

To distribute network traffic among multiple paths, network devices may also employ load sharing wherein packets belonging to a single forwarding equivalence class are distributed among multiple next-hops. The decision which one of multiple paths to take may depend on, e.g., generation of a random number, a hash of the packet or a section of the packet, etc.

The network device to which the present invention is applied may also implement other functionality including, e.g., access control lists (ACL), Quality of Service (QoS), etc. Packet handling decisions related to ACL or QoS depend on one or more of various packet header fields including, e.g., the source IP address, destination IP address, source IP port, destination IP port, protocol identifier (specifies layer 4 protocol), ToS (IP type of service), DSCP (Differentiated Services Codepoint) field, output interface identifier including virtual interface or virtual LAN (VLAN) identifier, etc. ACL or QoS processing may result in halting processing of the packet to enforce a routing policy or security policy, or in some other change of the packet's disposition.

Arriving and departing packets are typically encapsulated with a link layer header. The contents of the link layer header will depend on the particular link layer protocol being used. For example, the link layer header may include a link layer source and destination address. For arriving packets, the source link layer address will typically be the link layer address of the previous node traversed by the packet and the destination link layer address will be the link layer address of the receiving network device. For transmitted packets, the source link layer address will be the network device's link layer address and the destination link layer address will be the next-hop's link layer address. Link layer addresses may also be specific to network device linecards. It will be appreciated that a part of the packet forwarding operation will involve rewriting the link layer addresses before relaying the packet.

Some link layer protocols may not include source and destination addresses in their headers. For example, link layer frames that employ HDLC do not include source and destination link layer addresses. Headers for ATM cells and Frame Relay frames may include protocol-specific information identifying virtual circuits and/or virtual paths.

FIG. 1 depicts a network device 100 according to one embodiment of the present invention. Network device 100 includes a processor 102 that executes code stored in a program memory 104. The operations of processor 102 may also be implemented fully or in part by a programmable logic device, custom logic, etc. Program memory 104 is a computer-readable storage medium. Types of computer-readable storage media include volatile memory, read-only memory, programmable read-only memory, flash memory, etc. Another form of computer-readable storage medium storing the same codes would be some type of non-volatile storage such as floppy disks, CD-ROM, DVD-ROMs, hard disks, flash memory, etc. A carrier wave that carries code across a network is another type of computer-readable storage medium.

Network device 100 interfaces with physical media via a plurality of linecards 106. Although only two linecards 106 are shown, it is understood that there are numerous linecards within network device 100. It will also be appreciated that each linecard 106 may include numerous separate input/output ports. For example, a particular linecard may include large numbers of electrical and/or optical interfaces. Such interfaces include, but are not limited to, e.g., Ethernet interfaces, Gigabit Ethernet interfaces, DS-1 interfaces, DS-3 interfaces, Frame Relay interfaces, ATM interfaces, SONET interfaces, dial-up interfaces, DSL interfaces, wireless interfaces, etc. A switching fabric 110 interconnects linecards 106 with each other and with processor 102. A high-speed bus may substitute for switching fabric 110.

Figure 2:
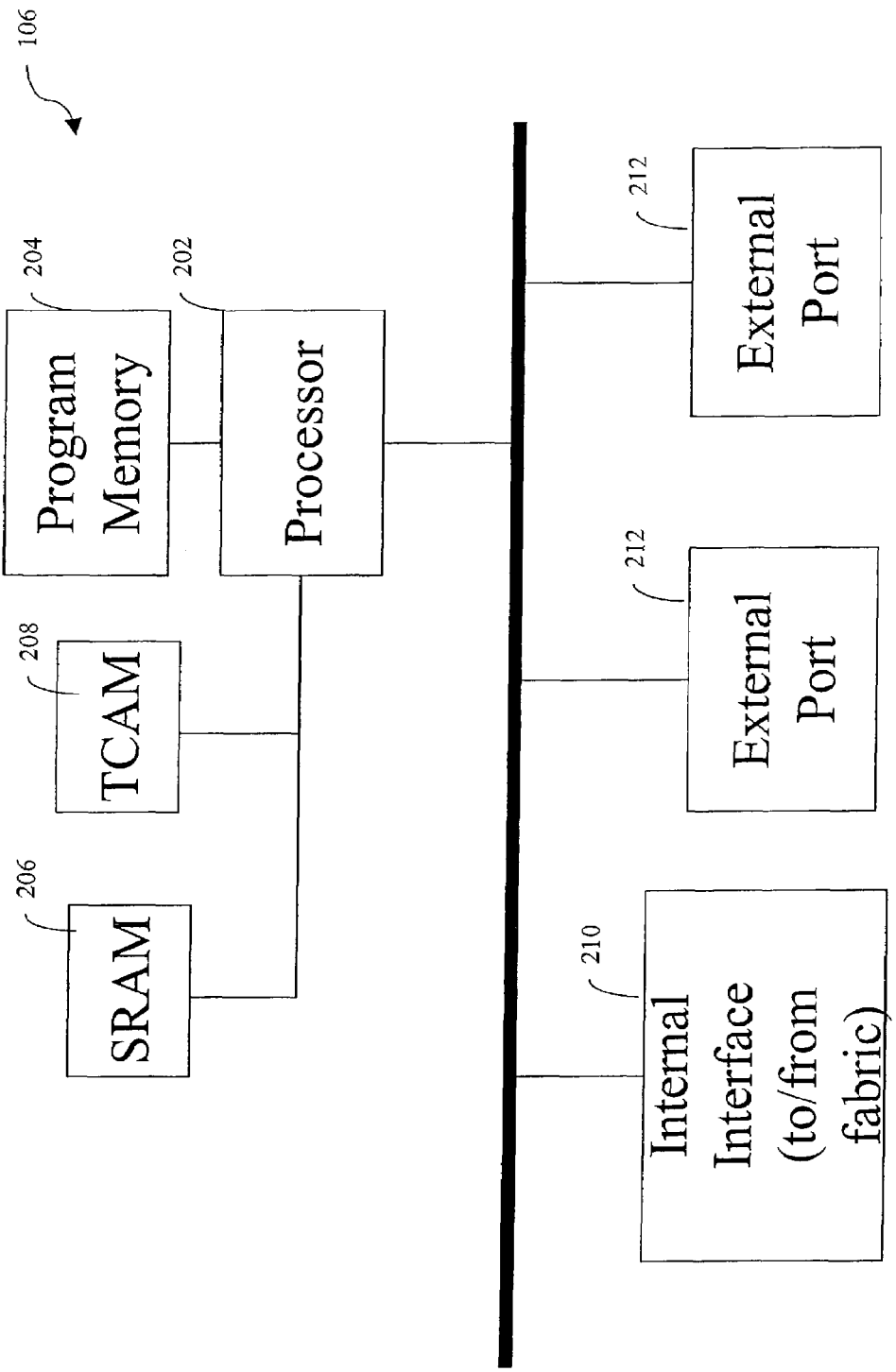
FIG. 2 depicts elements of a linecard within the network device of FIG. 1 according to one embodiment of the present invention.

FIG. 2 depicts structure of one of the linecards 106 according to one embodiment of the present invention. Linecard 106 includes a processor 202 to perform operations specified by aspects of the present invention. Processor 202, like processor 102, may be implemented as a device that executes a stored program device, a programmable logic device, a custom logic device, some combination thereof, etc. Code for use by processor 202 may be stored in a program memory 204. Program memory 204 may represent any of the computer-readable storage medium types described in reference to program memory 104. An SRAM device 206 is a memory storage device with high-speed access that is used to store forwarding information as will be described below. A ternary content-addressable memory (TCAM) 208 is another memory device that stores forwarding information. TCAM 208 may be used for high-speed content-based lookups. Other types of memory device such as, e.g., DRAMs, reduced latency DRAMS (RLDRAMS), etc., may substitute for, or supplement the memory devices shown in FIG. 2.

Linecard 106 includes an internal interface 210 to provide connectivity to other linecards via switching fabric 110. Linecard 106 also includes one or more external ports 212 (two are depicted). The precise structure of external ports 212 will of course depend on the particular type of network, transmission medium, etc. to which the ports are connected. In the discussion that follows, the linecard that receives a packet to be forwarded is called the ingress linecard and the linecard that transmits the packet is referred to as the egress linecard. A single linecard may act as both an ingress linecard and an egress linecard if the transmitting and receiving port are both on that linecard.

The processor and memory elements of the ingress linecard used to make forwarding decisions are referred to as the ingress forwarding engine. Similarly, the processor and memory elements of the egress linecard used to make forwarding decisions are referred to as the egress forwarding engine. Processor 102 of network device 100 may also implement a routing processor (RP) that helps populate data structures relating to forwarding on the various linecards. Embodiments of the present invention, however, may minimize the role of routing processor 102 in controlling such forwarding information in favor of the linecards themselves.

Figure 3:
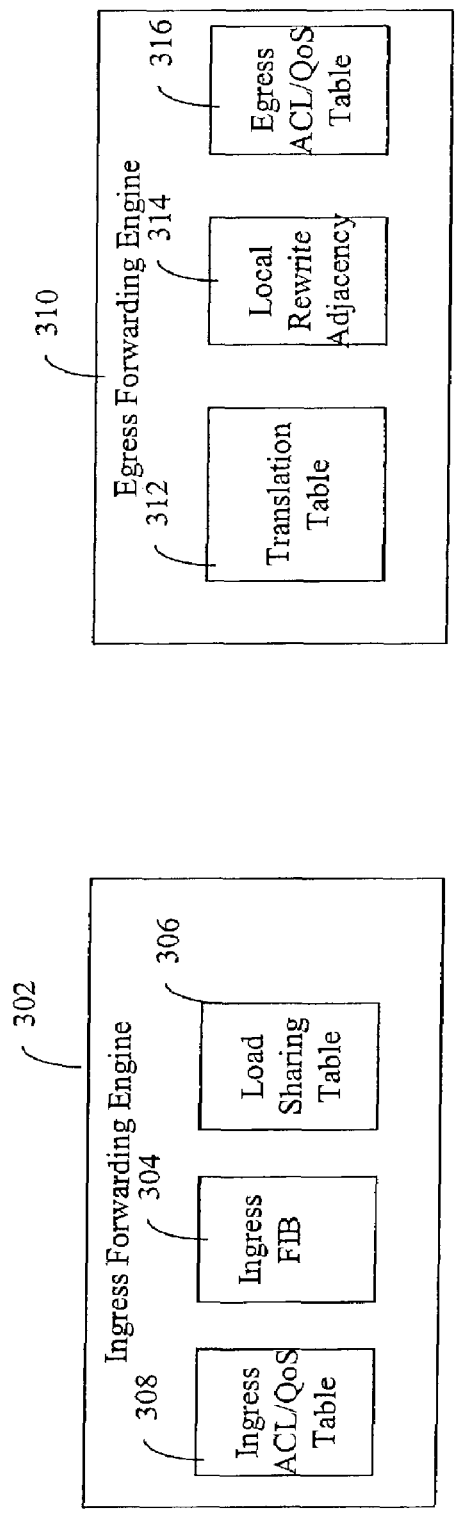
FIG. 3 depicts the data structures employed in packet forwarding operations according to one embodiment of the present invention.

FIG. 3 depicts various data structures useful in implementing a forwarding scheme of the present invention. An ingress forwarding engine 302 includes an ingress forwarding information base (FIB) 304, a load sharing table 306, and an ingress ACL/QoS table 308. Ingress FIB 304 is a table with individual entries corresponding to packet forwarding equivalence classes as identified by prefix and mask. For each entry there is a translation index that will be used in egress forwarding engine operations. For forwarding equivalence classes for which load sharing has not been established, the entry will also include an identifier specifying the egress linecard to be used for forwarding packets of that forwarding equivalence class to the next-hop. For forwarding equivalence classes for which load sharing has been established, the entry will include the pointer to load sharing table 306 along with a number of egress linecards among which traffic is being distributed.

The specific egress linecard to be used in a particular forwarding operation can be determined by employing the pointer as a base address with which to access load sharing table 306. To the base address an offset will be added. The number of possible offsets will be the number of egress linecards over which traffic is to be distributed. A specific offset will be chosen by use of an appropriate load sharing algorithm, e.g., by obtaining a hash of packet contents. Adding the offset to the base address identified by the pointer will specify a location in load sharing table 306 holding an identifier specifying a particular egress linecard to which to transfer the packet.

ACL/QoS table 308 includes entries that are indexed by a combination of various fields including, e.g., source IP address, destination IP address, source IP port, destination IP port, protocol identifier, output interface, ToS, DSCP, etc. A matching entry in table 308 may result in a different forwarding outcome for a packet than otherwise specified by tables 304 and 306. For example, the contents of an entry in table 308 may mandate that the packet be dropped due to enforcement of a routing policy or security policy. It is also possible for the entry's contents to mandate a different egress linecard or a different translation index.

Egress forwarding engine 310 makes use of a translation table 312, a local rewrite adjacency table 314, and an egress ACL/QoS table 316. Each translation index given by ingress FIB 304 is preferably a value in the range from 0 through $2^n-1$ that corresponds to the address space of translation table 312. Each entry of translation table 312 includes a pointer to local rewrite adjacency table 314. Local rewrite adjacency table 314 includes entries that identify the specific port to use in outputting the packet and the information that will be used to rewrite the packet link layer header to address the packet to the next hop node.

Egress forwarding engine 310 may implement its own load sharing scheme. Entries in translation table 312 for load sharing-enabled forwarding equivalence classes include in addition to the pointer, a count of next-hops or paths over which traffic is being distributed. The pointer value given by translation table 312 is then used as a base with an offset being computed based on a hash as in the ingress load sharing case. Maximum offset is of course determined by the maximum number of possible paths. It is thus seen that there are two stages of load sharing with load sharing operations being distributed between the ingress forwarding engine 302 and egress forwarding engine 310. Loads may be distributed among egress linecards and/or among paths to which a particular egress linecard connects. This provides a highly advantageous degree of load sharing flexibility.

As in ingress forwarding engine 302, there are also ACL/QoS operations in egress forwarding engine 310. After the access operations to translation table 312 and local rewrite adjacency table 314, there are also lookup operations to egress ACL/QoS table 316. The lookup is based on values such as, e.g., the source IP address, destination IP address, source port, destination port, protocol identifier, output port or output VLAN identifier, ToS, DSCP, etc. of the packet. Some of these values such as the output port or output VLAN identifier may be a result of the access to rewrite adjacency table 314. The result if there is a match may include, e.g., dropping the packet or modification of the output port or packet header contents.

Various memory technologies, including any mentioned in reference to FIG. 2, may be used to store the data structures shown in FIG. 3. For example, SRAM 206 may be used to store load sharing table 306, translation table 312, and local rewrite adjacency table 314 with TCAM 208 being used to store the ACL/QoS tables 308 and 316 and the ingress FIB 304. It is particularly advantageous that translation table 312 is an SRAM rather than a TCAM since this increases packet handling speed and reduces hardware complexity and cost.

The association between translation indices and forwarding equivalence classes is preferably determined globally for the network device 100 by the routing processor, e.g., processor 102 and propagated to the various linecards. Egress adjacency information, e.g., header rewrite information, will be generated either globally for the entire network device by processor 102 and propagated to all of the linecards or it may be generated locally to each egress forwarding engine 310 using the linecard processor. In the local generation case, there is typically no need to propagate adjacency information to other linecards. Furthermore, changes in adjacency at one linecard need not be propagated to other linecards in this case. This provides great advantages in scalability.

Figure 4:
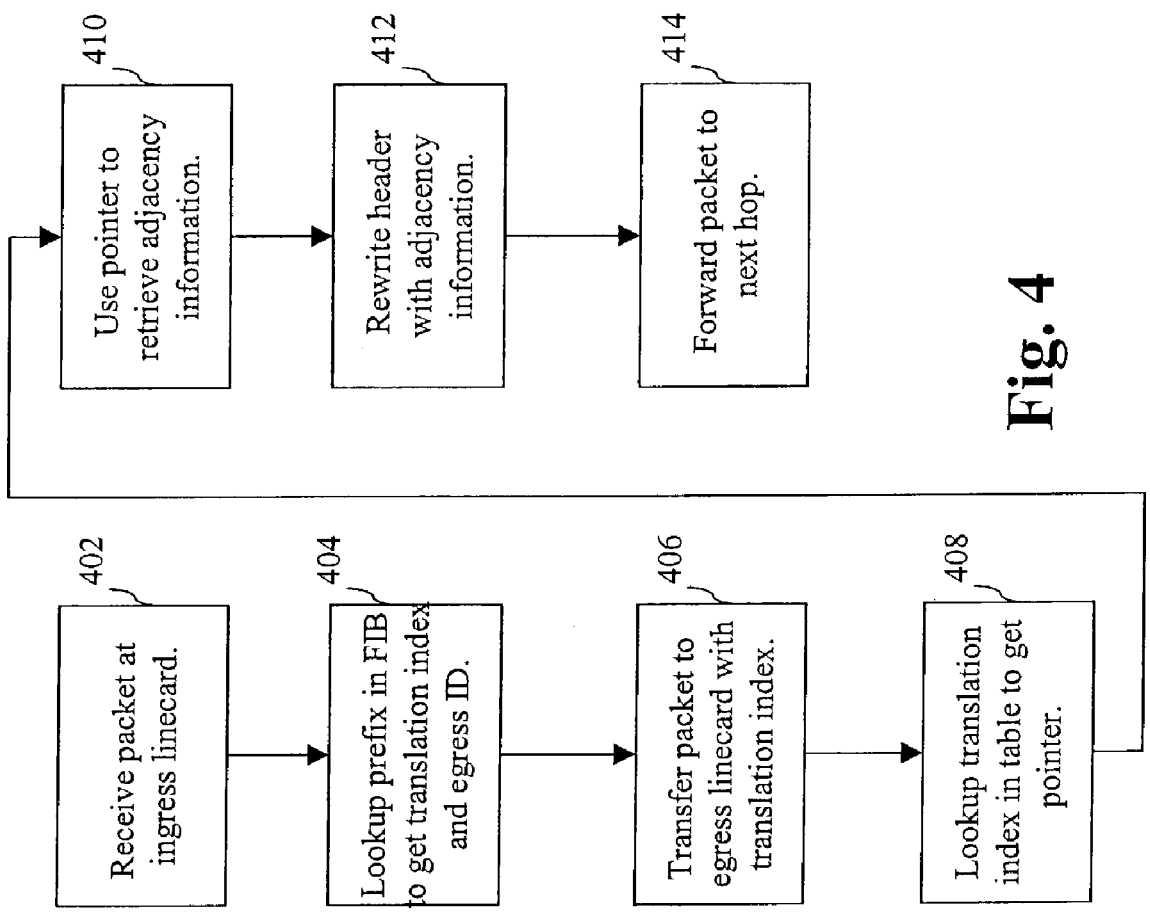
FIG. 4 depicts steps of forwarding a packet according to one embodiment of the present invention.

FIG. 4. is a flow chart describing steps of forwarding a packet according to one embodiment of the present invention. The steps of FIG. 4 will first be described with reference to a specific example that does not employ load sharing or ACL/QoS. At step 402, a packet is received at the ingress linecard. At step 404, ingress forwarding engine 302 identifies a forwarding equivalence class in ingress FIB 304 based on the packet's IP destination address. This step preferably employs content-addressable memory. The result of the lookup includes a translation index and an identifier specifying the egress linecard. At step 406, the packet is transferred to the selected egress linecard via the switching fabric 110 along with the retrieved translation index.

Operations now shift to egress forwarding engine 310. At step 408, the address of translation table 312 specified by the translation index is accessed to retrieve a pointer. Then at step 410, this pointer is used to identify a particular entry in local rewrite adjacency table 314. This entry identifies a specific output port and also gives necessary information for rewriting the link layer packet header. At step 412, the packet header is rewritten with the retrieved adjacency information. At step 414, the packet is forwarded to the next-hop via the selected output port.

On the ingress side load sharing modifies the operation of step 404. As described before, the entry in ingress FIB 304 is a pointer to load sharing table 306 in combination with an indicator of the number of egress linecards over which traffic is being distributed. Step 404 then includes the use of the load sharing algorithm to specify the correct entry in load sharing table 306 that will then identify a particular egress linecard. Load sharing on the egress side modifies the operation of step 408. As described above, for load sharing-enabled forwarding equivalence classes, translation table 312 will also give the number of paths over which traffic is distributed. The pointer employed at step 410 is then derived by use of an appropriate load sharing algorithm.

Also, as discussed above, ACL/QoS operations take place after the lookups to the tables 308 and 316. Packets may be dropped or forwarding operations may be modified based on the result of these lookups.

The distributed forwarding architecture described above carries many advantages. The egress forwarding engines can locally maintain and update information on their adjacent nodes. This information need not be propagated to numerous ingress forwarding engines. The use of content-addressable memory is minimized. There are potentially two stages of load sharing. It is thus relatively easy to distribute traffic among egress cards so that they do not overload to the point of dropping packets.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for operating a network device to forward a packet, said method comprising:
   receiving said packet at an ingress forwarding engine;
   at said ingress forwarding engine, performing an address-based look-up in an ingress look-up table to identify an egress forwarding engine and a translation index;
   transferring said packet to said identified egress forwarding engine along with said identified translation index;
   at said identified egress forwarding engine, retrieving a pointer from a memory location specified using said translation index as an address; and
   using said pointer to retrieve adjacency information for said packet;
   said ingress forwarding engine and said egress forwarding engine sharing an association between said translation index and a particular forwarding equivalence class.

2. The method of claim 1 wherein retrieving said pointer comprises:
   retrieving said pointer from a memory device that is not content-addressable.

3. The method of claim 1 wherein said pointer is retrieved from an SRAM device.

4. The method of claim 3 further comprising:
   modifying contents of said SRAM device in accordance with adjacency information generated globally for said network device.

5. The method of claim 3 further comprising:
   modifying contents of said SRAM device in accordance with adjacency information generated locally for said egress forwarding engine.

6. The method of claim 1 further comprising:
   writing a header of said packet based on said retrieved adjacency information; and
   forwarding said packet to a next-hop.

7. The method of claim 1 wherein said translation index and said particular forwarding equivalence class have a one-to-one correspondence therebetween.

8. The method of claim 1 wherein said association between said translation index and said particular forwarding class is shared among all forwarding engines of said network device.

9. Apparatus for forwarding a packet, said apparatus comprising:
   a first forwarding engine that performs an address-based look-up for said packet in an ingress look-up table to identify an egress forwarding engine and a translation index and transfers said packet to said identified egress forwarding engine along with said identified translation index; and
   a second forwarding engine that retrieves a pointer from a memory location specified by said translation index without use of content-based addressing; and uses said pointer to retrieve adjacency information for said packet;
   wherein said ingress forwarding engine and said egress forwarding engine share an association between said translation index and a particular forwarding equivalence class.

10. The apparatus of claim 9 wherein said pointer is retrieved using said translation index as an address.

11. The apparatus of claim 9 further comprising an SRAM device for storing said pointer.

12. The apparatus of claim 9 further comprising a routing processor independent of said ingress and egress forwarding engines that modifies contents of a SRAM device to implement a routing update.

13. The apparatus of claim 9 further comprising a processor that is collocated with said egress forwarding engine and that modifies contents of a SRAM device to implement a routing update.

14. The apparatus of claim 9 wherein said second forwarding engine writes a header of said packet based on said retrieved adjacency information and forwards said packet to a next-hop.

15. The apparatus of claim 9 wherein said translation index and said particular forwarding class have a one-to-one correspondence therebetween.

16. The apparatus of claim 9 wherein said association between said translation index and said particular forwarding class is shared among all forwarding engines of said network device.

17. Apparatus for operating a network device to forward a packet, said apparatus comprising:
- means for receiving said packet at an ingress forwarding engine;
- means for, at said ingress forwarding engine, performing an address-based look-up in an ingress look-up table to identify an egress forwarding engine and a translation index;
- means for transferring said packet to said identified egress forwarding engine along with said identified translation index;
- means for, at said identified egress forwarding engine, retrieving a pointer from a memory location specified using said translation index as an address; and
- means for using said pointer to retrieve adjacency information for said packet; and
- wherein said ingress forwarding engine and said egress forwarding engine share an association between said translation index and a particular forwarding equivalence class.

18. A computer program product stored on a computer-readable storage medium having computer-readable program codes when executed by a computer which cause the computer to operate a network device to forward a packet, said computer program product comprising:
- code that receives said packet at an ingress forwarding engine;
- code that, at said ingress forwarding engine, performs an address-based look-up in an ingress look-up table to identify an egress forwarding engine and a translation index;
- code that transfers said packet to said identified egress forwarding engine along with said identified translation index;
- code that, at said identified egress forwarding engine, retrieves a pointer from a memory location specified using said translation index as an address;
- code that uses said pointer to retrieve adjacency information for said packet; and
- the computer-readable storage medium that stores the codes; and
- wherein said ingress forwarding engine and said egress forwarding engine share an association between said translation index and a particular forwarding equivalence class.

19. The computer program product of claim 18 wherein said translation index and said particular forwarding equivalence class have a one-to-one correspondence therebetween.

20. The computer program product of claim 18 wherein said association between said translation index and said particular forwarding class is shared among all forwarding engines of said network device.

\* \* \* \* \*